United States Patent

Merser et al.

Patent Number: 5,890,327
Date of Patent: Apr. 6, 1999

[54] METHOD OF REINFORCING THE ROOF OF A BUILDING AGAINST HURRICANE-FORCE WINDS

[75] Inventors: N. Keith Merser, North Branch, Mich.; Frederick A. Kish, Wheeling, Ill.

[73] Assignee: ITW Foamseal, Oxford, Mich.

[21] Appl. No.: 756,954

[22] Filed: Dec. 2, 1996

[51] Int. Cl.[6] .................................. E04B 7/04; E04D 3/36
[52] U.S. Cl. ...................... 52/91.3; 52/309.5; 52/309.11; 52/92.1; 52/91.3; 52/741.3; 52/749.12; 52/746.11; 52/745.12; 156/71; 156/79
[58] Field of Search .............................. 52/741.3, 309.5, 52/309.11, 602, 91.3, 92.1, 93.1, 749.12, 746.11, 745.12; 156/71, 79; 209/906; 124/56; D18/135

[56] References Cited

U.S. PATENT DOCUMENTS

| | | | |
|---|---|---|---|
| 4,241,553 | 12/1980 | Reicherts et al. | 52/309.5 |
| 4,914,883 | 4/1990 | Wencley | 52/309.5 |
| 5,425,908 | 6/1995 | Merser | 52/309.5 X |

*Primary Examiner*—Christopher Kent
*Assistant Examiner*—W. Glenn Edwards
*Attorney, Agent, or Firm*—Schwartz & Weinrieb

[57] ABSTRACT

A method of reinforcing or retrofitting building roof structures against hurricane-force winds which does not require removal of part or all of the roof. The improved method includes directing a thin stream of a liquid polymer foam adhesive under pressure upwardly along the intersections of the rafters or support members and the roof panels, preferably on both sides of the support members. The foam adhesive then creams and foams, forming polymer foam adhesive gussets which firmly adhere to the adjacent surfaces of the support members and roof panels. This method increases the pull-off strength of a roof about seven fold and is able to withstand hurricane-force winds.

15 Claims, 1 Drawing Sheet

METHOD OF REINFORCING THE ROOF OF A BUILDING AGAINST HURRICANE-FORCE WINDS

FIELD OF THE INVENTION

This invention relates to an improved method of reinforcing or retrofitting and securing the roof of a building against the destructive forces of a hurricane, tornado or the like. The roof of a building in a hurricane, for example, is subjected to very great lift or "uplift" forces which tears the roof panels from the rafters, exposing the interior and contents of the building to the weather, which causes further substantial damage.

BACKGROUND OF THE INVENTION

Hurricanes and other extreme weather conditions cause many millions of dollars of damage to property each year. The most common damage to buildings by such events is the "loss" of the roof, which exposes the building interior and contents to water and wind damage. Many attempts have been made over the years to limit the damage to the roofs of buildings due to hurricane-force winds, but such attempts have not proven successful or commercially feasible. For example, the roof could be removed or partially removed and reinforced using improved mechanical fastening systems. But such methods would cost each homeowner thousands of dollars and mechanical fasteners have not proven satisfactory. The urgent need for a solution to this serious problem therefore remains.

A typical roof construction generally includes equally spaced rafters or truss members which are supported and attached to the upper structure of the building, above the attic, for example, in a typical home construction. The rafters may pitch upwardly and be secured to a ridgeboard, forming a triangular or "peaked" roof, or the rafters may extend horizontally forming a flat roof. Alternatively, triangular or rectangular engineered trusses may be used as the roof support. Roof boards or panels are then attached to the transverse spaced support members, that is, the rafters or the upper chords of the engineered roof trusses, generally by driving nails through the roof panels into the support members. Roof boards may be used or panels, such as 4'×8' sheets of plywood sheathing, fiberboard or the like. For ease of description, the term panels will be used hereinafter to include roof boards or larger panels, such as the 4'×8' sheathing typically used in home constructions. The roofing, which generally includes roof tiles or shingles, is then secured on the roof panels.

A hurricane, for example, may create uplift forces or a vacuum in excess of 100 lbs./sq. ft., tearing the nailed roof panels from the support members. Nails or screws are not able to withstand such uplift forces. Glues and various adhesives and additional mechanical fasteners have also been tried without success under hurricane-force winds. It should also be noted that once one or a few roof panels are torn from the support members, the entire roof or a large portion of the roof may be torn from the structure. The exposed building interior and contents will then be subject to water and wind damage, which may exceed the cost of repairing or replacing the roof. There is, therefore, an urgent need for a method of reinforcing and securing the roof of a building against uplift forces such as encountered in hurricanes, particularly for existing building structures, preferably not requiring removal of the roof.

SUMMARY OF THE INVENTION

The method according to reinforcing and securing the roof of a building of this invention results in a roof which is able to withstand the extreme forces encountered in a hurricane, for example, and may be used to retrofit existing buildings, without requiring partial or total removal of the roof. The method of this invention is suitable for reinforcing and securing the roof of a building of the type having a plurality of generally flat roof panels and a plurality of transverse generally equally spaced support members each having a generally flat edge face supporting the roof panels in generally abutting relation, wherein the support members are attached to the roof panels by mechanical fasteners, generally nails.

The method of this invention includes directing a fine stream of a liquid foamable polymer adhesive under pressure upwardly, generally along the intersections between the support members and the roof panels, which are adjacent the generally abutting edge faces of the support members. The method then includes allowing the liquid foamable polymer adhesive to cream and rise, forming generally triangular gussets of polymer foam adhesive bonded to the surfaces of both the support members and the roof panels and extending along the intersections thereof and filling spaces between the generally abutting end faces of the support members and the roof panels.

The liquid foamable polymer adhesive can be applied with a liquid applicator gun available from Gusmer, Inc. of Lakewood, New Jersey, modified or adjusted to direct a fine stream of liquid under pressure, rather than a spray. In the preferred method of this invention, a plural component liquid foamable polymer adhesive is utilized, most preferably a plural component liquid foamable polyurethane adhesive. Thus, the preferred method of this invention includes mixing the components of a plural component liquid foamable polymer adhesive in the mixing chamber of a liquid application gun, then using the gun to direct a fine stream of foamable adhesive along the intersections or interface between the support members and the roof panels as described herein. In a conventional two story building having a peaked or triangular roof, the spray equipment can be set up in the attic and the liquid stream of foamable polymer adhesive is then directed upwardly along the intersections of the support members and the roof panels by an operator standing on the floor of the attic.

The most preferred method of this invention includes directing a stream of liquid foamable polymer adhesive upwardly along both sides of the support members forming gussets of polymer adhesive foam on both sides of the support members and the adjacent surfaces of the roof panels. Surprisingly, the method of this invention results in a seven fold increase in the uplift forces required to tear the roof panels from the support members over conventional nails alone. A roof of this type which has been reinforced using the method of this invention is able to withstand an uplift force equivalent to 110 lbs./sq. ft. on a flat roof, which is equivalent to a wind force of 110 miles/hr. Thus, a building roof which has been reinforced using the method of this invention will be able to withstand the wind forces normally encountered in a hurricane, substantially reducing building damage under such conditions.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF A PREFERRED EMBODIMENT OF THE INVENTION

Figure 2:
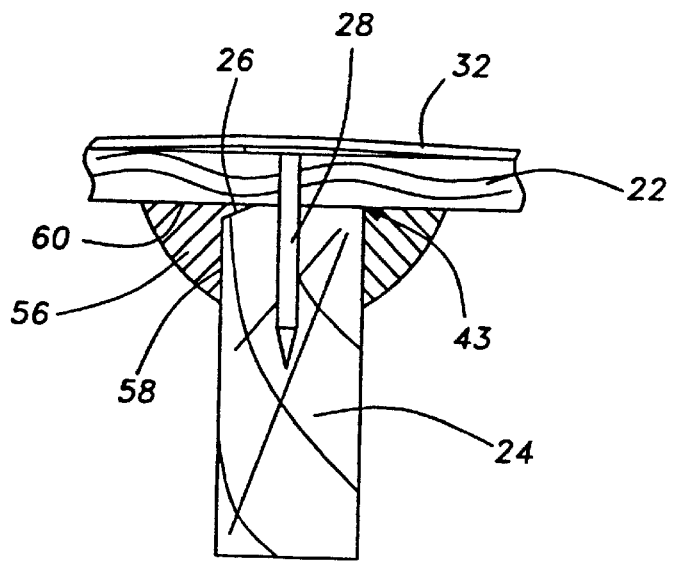
FIG. 2 is a cross-sectional view of the reinforced roof structure of FIG. 1 as taken along the lines 2—2.

As described, the method of this invention is adapted to reinforce and secure the roof of a building against extreme hurricane-force winds tending to lift the roof from the building, such as encountered in hurricanes, tornados and the like. The method of this invention is particularly adapted to roof structures, including pre-existing building roofs 20, which includes a plurality of generally flat roof panels 22 and a plurality of substantially transverse, generally equally spaced support members 24 each having a generally flat edge face 26 supporting the roof panels 22 in generally abutting relation, with the support members 24 attached to the roof panels by nails or mechanical fasteners 28. In the disclosed embodiment of the roof structure 20, the roof panels 22 are 4'×8' panels of plywood or fiberboard, commonly referred to as "sheathing." Alternatively, the roof panels 22 may be six, eight or ten inch wood boards, commonly referred to as "roof boards." The transverse support members 24 are commonly 2"×4"s or 2"×6"s, commonly referred to as "rafters." Alternatively, the support members are engineered roof trusses, wherein the roof panels are attached to the top or long chord of the roof trusses. The roof panels 22 are generally attached to the support members 24 by nails 28, generally 2" nails, which are driven through the support member 22 into the end face 26 of the support members 24 as shown in FIG. 2.

Figure 1:
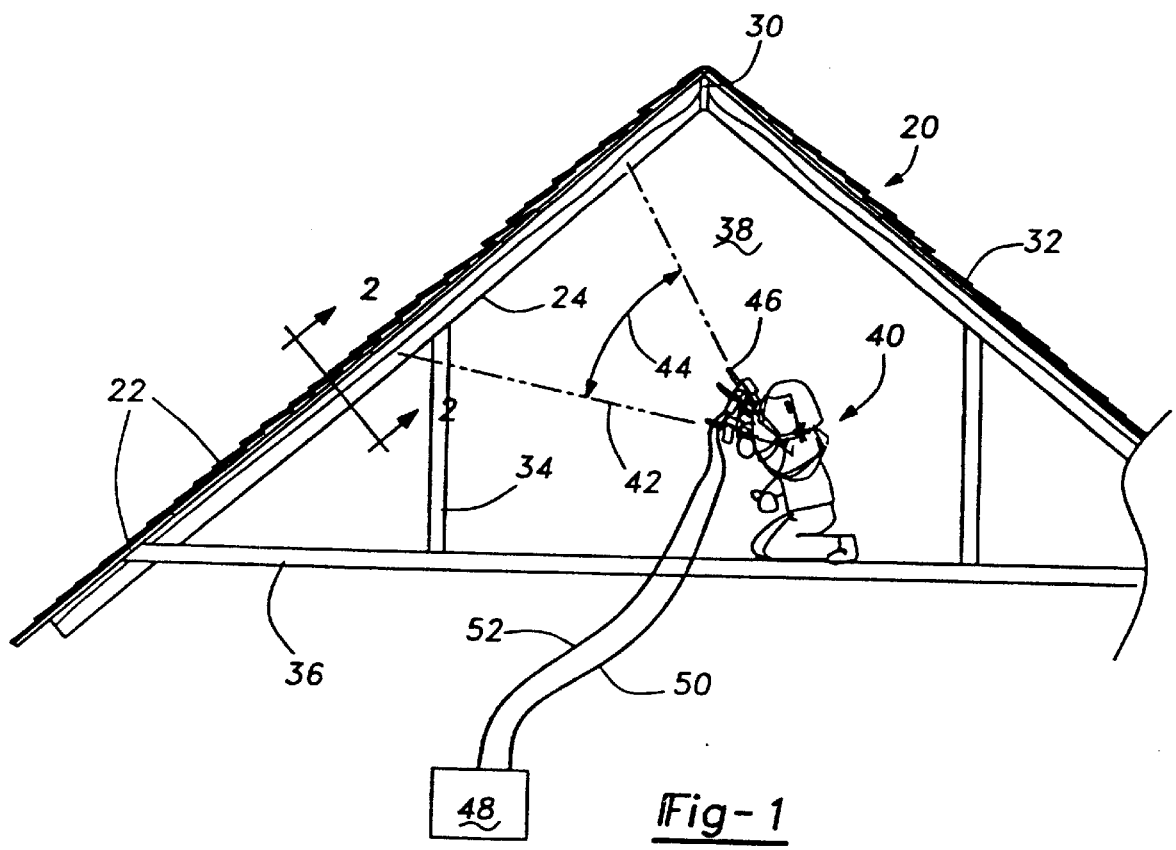
FIG. 1 is a side elevation of a preferred embodiment of the method of this invention for reinforcing the roof of a building having a conventional peaked roof.

As set forth above, the roof 20 may be triangular or peaked as shown in FIG. 1, wherein the support members 24 and the roof panels 22 are attached to a ridgeboard 30 or the roof may be flat with horizontal support members 24 or wherein rectangular roof trusses are used. A roof 20 of the type shown in FIG. 1 is generally covered with shingles 32, which are attached to the roof panels 22, and additional support for the roof is provided by studs 34. Spaced bridging members 36 support the support members 24 and roof panels 22, defining the attic space 38.

As described herein, the method of reinforcing or retrofitting and securing the roof of a building of this invention includes directing a thin stream of a liquid foamable polymer adhesive upwardly generally along the intersections 43 between the support members 24 and the roof panels 22 so as to form reinforcing gussets of polymer foam adhesive 56, as now described. In the disclosed embodiment of the roof structure 20, the operator 40 will generally be located in the attic space 38 on the bridging members 36. The operator 40 directs a thin stream 42 of a liquid foamable polymer adhesive under pressure upwardly along the intersections 43 of the support members 24 and the roof panels 22. Arrow 44 indicates a suitable motion of the thin stream of liquid foamable resin 42. In the most preferred embodiment, a plural component liquid foamable polymer adhesive is utilized, most preferably a two component liquid foamable polyurethane adhesive available from ITW Foamseal of Oxford, Mich. under the trademark name SF2100 described more fully hereinbelow. In the most preferred embodiment of the method of this invention, a thin stream of a liquid foamable polymer adhesive is directed upwardly under pressure along the intersection 43 of the support members 24 and the roof panels 22 on both sides of the support members 24, forming gussets of polymer foam adhesive 56 on both sides of the support member 24 as shown in FIG. 2. As used herein, "upwardly" refers to the general direction of the stream 42 as it is applied to the interior roof structure of a building and not to the direction of the movement of the stream or the direction of the stream over the entire application.

The components of the liquid foamable polymer adhesive are generally contained in application apparatus 48. This apparatus includes storage for the components of the liquid foamable polymer adhesive, a pump, valving, and the like. Application apparatus of this type is available from ITW Foamseal. The components of the liquid foamable resin adhesive are then separately supplied under pressure through lines 50 and 52 to application gun 46, which is controlled and operated by the operator 40. A suitable application gun is available from Gusmer, Inc. of Lakewood, N.J., Model D, preferably with a high pressure impingement mixing chamber, nozzle size 46 or 55. The components of the liquid foamable resin adhesive are then supplied from the application apparatus 48 through lines 50 and 52 to the impingement mixing chamber of the gun 46, where the components are thoroughly mixed and substantially immediately directed upwardly in a thin stream along the intersections of the support members 24 and roof panels 22 by operation of a trigger mechanism on the application gun 46.

The thin stream of liquid foamable resin adhesive upon application initially forms a thin bead of liquid along the intersections 43 of the support members 24 and the roof panels 22. Almost immediately, this thin bead begins to cream and rise forming gussets 56 of polymer foam adhesive which firmly adheres to the surfaces 58 and 60 of the support members 24 and roof panels 22, respectively, adjacent the intersections 43. Further, the foam polymer adhesive fills the spaces between the abutting end face 26 of the support members 24 and the roof panels 22, further strengthening the connection between the roof panels 22 and the support members 24. As will be understood by those skilled in the building construction art, the rafters 24 or the chords of a roof truss are not exactly dimensioned or "true." That is, the boards for rafters or the wood components of a truss assembly are somewhat warped and include relatively rough edges. The liquid foamable resin is thus able to expand into spaces between the edge face 26 of the support members 24 and the roof panels 22, actually improving the structural integrity of the connection between the support members 24 and the roof panels 22. In actual testing of the structural integrity of a roof structure described below, the method of reinforcing the roof of a building of this invention resulted in significant increases in the strength resistant to the pull-out force of the roof panels of seven fold, resulting in a reinforced roof structure able to withstand hurricane force winds.

TEST EXAMPLES

Testing of roof panels made by the method of this invention was conducted by Clemson University at the Wind Load Test Facility of the Department of Civil Engineering at Clemson, S.C. under the Blue Sky Research Initiative. Panels were constructed using 4'×8' sheets of plywood sheathing (APA Exposure One), spruce-pine-fur (SPF) or southern yellow pine (SYP) rafters and, if used, 0.113" diameter 2" long nails. The following construction combinations were used:

| Test | Rafters | Fasteners |
| --- | --- | --- |
| 1 | SPF spaced 24" on center | no nails |
| 2 | SPF spaced 24" on center | hand-driven nails |

-continued

| Test | Rafters | Fasteners |
|------|---------|-----------|
| 3 | SPF spaced 24" on center | power-driven nails |
| 4 | SPF spaced 24" on center | power-driven nails |
| 5 | SYP spaced 24" on center | power-driven nails |
| 6 | SYP spaced 24" on center | no nails |
| 7 | SPF spaced 16" on center | power-driven nails |

In all of the tests, the rafters or support members were attached to the sheathing or roof panels extending parallel to the 4' side, with one rafter on each side of the roof panel adjacent the edge. In tests numbers 2, 3 and 5, the outside rafters, respectively adjacent the edges were attached with nails spaced six inches apart and the inside rafters were attached with nails spaced twelve inches apart. In test number 4, the studs were attached on twenty-four inch centers with only one nail driven through the panel into the rafter adjacent each end of the rafters. In test number 7, the rafters were attached similar to test number 4, except that the rafters were attached to the sheathing on sixteen inch centers. In all of the tests, a thin bead of a liquid foamable polymer adhesive was applied to both sides of the rafters by directing a thin stream of a liquid foamable polymer adhesive along the intersections 43, forming gussets 56 of polymer foam adhesive bonded to the surfaces 58 and 60 of the support members 24 and the roof panels or sheathing 22 as shown in FIGS. 1 and 2. In these tests, the liquid foamable polymer adhesive was the SF2100 two component polyurethane foam and adhesive of ITW Foamseal applied by ITW Foamseal.

Panels were then tested by Clemson University using the Building Research Establishment Real-Time Wind Uniform Load Follower (BRERWULF). This device is capable of applying a positive or negative pressure up to 180 lbs./sq. ft. to a sealed chamber. The pressure can be varied either by computer or by hand. To seal each test sample in the chamber, 4 millimeter polyurethane was placed over the entire test sample and secured to the sides of the test chamber with duct tape to create a "bubble." A gradually increasing negative pressure (suction) was then applied to each panel until failure occurred or the maximum negative pressure was reached, namely 180 lbs./sq. ft. Pressure inside the chamber was determined using a water manometer. The following summarizes the results of the tests:

| Test | Failure Pressure |
|------|------------------|
| 1 | 170 psf |
| 2 | No Failure |
| 3 | No Pailure |
| 4 | 180 psf |
| 5 | No Failure |
| 6 | 161 psf |
| 7 | No Failure |

All panels failed in generally the same manner. The failure occurred in the bond between the rafter and the adhesive. The majority of the test panels made by the method of this invention remained on the sheathing.

From previous tests performed by Clemson University on roof panel systems using nails alone, wherein spruce-pine-fur (SPF) rafters were attached to the sheathing as described above in connection with tests 2–7, the average ultimate failure pressure was 25 lbs./sq. inch. The comparable panel test using the method of this invention had an ultimate failure pressure in excess of 180 lbs./sq. inch, as described above in regard to test number 2. Thus, the method of reinforcing the roof of a building against forces tending to lift the roof panels from the supporting rafters or support members of this invention results in greater than a seven fold increase in structural integrity compared to using nails alone.

The negative pressure of 180 lbs./sq. ft. used in the above described tests is equivalent to an uplift force of 110 mile per hour wind or hurricane-force winds. Thus, a building roof structure which is reinforced by the method of this invention will be able to withstand hurricane-force winds. This invention, therefore, fulfills a long felt need to reduce property damage resulting from hurricanes which many others have previously tried to solve, but failed.

The SF2100 polyurethane foam adhesive of ITW Foamseal is a closed cell resilient foamable polyurethane thermosetting resin designed to be applied through a high pressure impingement mixing application gun, such as the Model D gun of Gusmer, Inc. described above. SF2100 foamable polyurethane adhesive adapted for this application has the following formulation by weight:

| | A-ISO COMPONENT |
|---|---|
| 100% | 4,4'-diphenylmethane diisocyanate, Dow Chemical |
| | B-RESIN COMPONENT |
| 40–42% | "Poly-G" rigid polyol, Olin Chemical |
| 20–22% | "D400" jeffamine polyol, Huntsman Chemical |
| 33–37% | "R420" amine polyol, Eastman Chemical |
| 0.8–1.5% | "L5420" silicone surfactant, OSI Chemical |
| 1.8–2.2% | Water |

The pump of the application equipment accurately meters the material one-two-one by volume and develops at least 400 psi hydraulic pressure while spraying and 800–1000 psi when installed. The material temperature leaving the application gun should be between about 110° F.–135° F. The material in the drums should be maintained at a temperature no less than 65° F. and a temperature of 75° F. is recommended to prevent cavitation of the pumps. The surfaces of the support members and roof panels to which the liquid foamable polymer adhesive is applied should be clean and dry with loose dust and particles blown off and free from water, oil or grease. The temperature of the roof panels and support members should be 60° F. or greater.

The mixing gun should be adjusted so that the applicator can accurately direct a thin stream of liquid polymer adhesive which generates a polymer foam adhesive gusset of about 1.25" to 1.5" at the intersection of the support members and the roof panels. The processing conditions and physical properties of the F2100 liquid foamable polyurethane adhesive are indicated below:

TABLE I

| ITW FOAMSEAL F2100 | |
|---|---|
| Processing Conditions | |
| Cream time (sec.) | 15–25 |
| Tack free time (sec.) | 55–85 |
| Component temperatures (°F.) | 100–135 |
| Bead thickness, inches | 1–2 |
| Resin viscosity @ 25° C., cps. | 850–1100 |
| Subtrate temperature (°F.) | 70 |
| Physical Properties | |
| Density, lbs. per cu. ft. (core) | 2.3 |
| Tensile strength, psi ultimate parallel to rise | 32 |

TABLE I-continued

ITW FOAMSEAL F2100

| | |
|---|---|
| Heat distortion temperature (°F.) | 225 |
| Dimensional stability, % change after 28 days at 100% RH and 158° F. | −1% weight, 16% volume |

Having described the method of this invention in terms of the most preferred embodiment, it will be understood that various modifications may be made to the method of this invention within the purview of the appended claims. For example, although the method of this invention was specifically adapted to refurbish and reinforce existing homes and other buildings having a roof construction generally as described herein so as to withstand hurricane force winds, it will be understood that the method of this invention may also be used in new building construction, particularly buildings subject to extreme wind forces. Further, the roof construction is not limited to the specific examples provided herein and thus may be used on other construction which must withstand extreme forces. Finally, the method of this invention is not limited to roof constructions having nails driven through the roof panels into the rafters or other support members and the term support members is used herein to cover rafters, roof trusses and like. Having described the invention, the invention is now claimed, as set forth below.

We claim:

1. A method of reinforcing and securing the roof of a building against high-speed wind forces tending to lift the roof off the building, wherein said roof comprises a plurality of substantially flat roof panels having substantially downwardly oriented interior surfaces and substantially upwardly oriented exterior surfaces, a plurality of transversely extending, longitudinally spaced support members respectively having upper ends for supporting said roof panels in a substantially abutting relationship, and a plurality of mechanical fasteners fixedly securing said plurality of substantially flat roof panels to said plurality of support members, comprising the steps of:

directing a thin elongated streams under pressure, of a liquid foamable polymer adhesive into corner regions formed at the intersections defined between said upper ends of said support members and said interior surfaces of said roof panels; and allowing said liquid foamable polymer adhesive to cream and rise, forming gussets of polymer foam adhesively bonded to said upper ends of said support members and said interior surfaces of said roof panels and within said corner regions defined by said intersections so as to adhesively bond portions of said interior surfaces of said roof panels to said upper ends of said support members thereby substantially increasing the force required to separate said interior surface portions of said roof panels from said upper ends of said support members and lift said roof panels off said support members when high-speed winds blow over said exterior surfaces of said roof panels.

2. The method of reinforcing and securing the roof of a building as set forth in claim 1, further comprising the steps of:

heating and mixing the components of a plural component liquid foamable polymer adhesive under pressure in a mixing chamber of a liquid application gun; and using said gun to direct said thin elongated stream of liquid foamable polymer adhesive upwardly along the intersections defined between said upper ends of said support members and said interior surfaces of said roof panels.

3. The method of reinforcing and securing the roof of a building as set forth in claim 1, further comprising the steps of:

heating and mixing under pressure the components of a two component liquid foamable polyurethane adhesive in a mixing chamber of a liquid application gun; and using said gun to direct said thin elongated stream of liquid foamable polyurethane adhesive upwardly along the intersections defined between said upper ends of said support members and said interior surfaces of said roof panels.

4. The method of reinforcing and securing the roof of a building against forces tending to lift the roof from the building as set forth in claim 1, further comprising the step of:

directing said thin elongated stream of liquid foamable polymer adhesive upwardly along both sides of each one of said support members so as to form gussets of said liquid foamable polymer adhesive upon both sides of said support members and along adjacent surface portions of said upper ends of said support members and said interior surfaces of said roof panels.

5. A method of reinforcing and securing the roof of an existing building against high-speed wind forces tending to lift the roof off the building, wherein said roof comprises a plurality of substantially flat roof panels having substantially downwardly oriented interior surfaces and substantially upwardly oriented exterior surfaces, a plurality of transversely extending, longitudinally spaced support members respectively having upper ends for supporting said roof panels in a substantially abutting relationship, and a plurality of mechanical fasteners fixedly securing said plurality of substantially flat roof panels to said plurality of support members, comprising the steps of:

directing a fine elongated stream, under pressure, of a liquid plural component foamable polymer adhesive into corner regions formed at the intersections defined between said upper ends of said support members and said interior surfaces of said roof panels; and allowing said liquid plural component foamable polymer adhesive to cream and rise, forming gussets of cured polymer foam adhesively bonded to said upper ends of said support members and said interior surfaces of said roof panels and within said corner regions defined by said intersections so as to adhesively bond portions of said interior surfaces of said roof panels to said upper ends of said support members thereby substantially increasing the force required to separate said interior surface portions of said roof panels from said upper ends of said support members and lift said roof panels off said support members when high-speed winds blow over said exterior surfaces of said roof panels.

6. The method of reinforcing and securing the roof of an existing building as set forth in claim 5, further comprising the steps of:

heating and mixing the components of said plural component liquid foamable polymer adhesive in a mixing chamber of a liquid application gun; and using said gun to direct said fine elongated stream of liquid foamable polymer adhesive upwardly along said intersections defined between said upper ends of said support members and said interior surfaces of said roof panels.

7. The method of reinforcing and securing the roof of an existing building against forces tending to lift the roof off the building as set forth in claim 5, further comprising the step of:

directing said fine elongated stream of said liquid plural component foamable polymer adhesive upwardly along both sides of each one of said support members so as to form gussets of said liquid plural component foamable polymer adhesive upon both sides of said support members and along adjacent surface portions of said upper ends of said support members and said interior surfaces of said roof panels.

8. The method of reinforcing and securing the roof of a building as set forth in claim 1, wherein:

said thin elongated stream of said liquid foamable polymer adhesive initially forms a thin bead of liquid foamable polymer adhesive along said intersections defined between said upper ends of said support members and said interior surfaces of said roof panels before creaming and rising so as to form said gussets of polymer foam adhesively bonded to said upper ends of said support members and said interior surfaces of said roof panels.

9. A method of reinforcing and securing the roof of a building against high-speed wind forces tending to lift the roof off the building, wherein said roof comprises a plurality of substantially flat roof panels having substantially downwardly oriented interior surfaces and substantially upwardly oriented exterior surfaces, a plurality of transversely extending, longitudinally spaced support members respectively having upper ends for supporting said roof panels in a substantially abutting relationship which may include spaces therebetween, and a plurality of mechanical fasteners fixedly securing said plurality of substantially flat roof panels to said plurality of support members, comprising the steps of:

heating and mixing the components of a plural component liquid foamable polyurethane adhesive;

directing a thin elongated stream, under pressure, of said plural component liquid foamable polyurethane adhesive into corner regions formed at the intersections defined between said upper ends of said support members and said interior surfaces of said roof panels; and allowing said plural component liquid foamable polyurethane adhesive to cream and rise, forming gussets of polyurethane foam adhesively bonded to said upper ends of said support members and said interior surfaces of said roof panels, within said corner regions defined by said intersections of said upper ends of said support members and said interior surfaces of said roof panels, and filling said spaces therebetween so as to adhesively bond portions of said interior surfaces of said roof panels to said upper ends of said support members thereby substantially increasing the force required to separate said interior surface portions of said roof panels from said upper ends of said support members and lift said roof panels off said support members when high-speed winds blow over said exterior surfaces of said roof panels.

10. The method as set forth in claim 1, wherein:

said thin elongated stream of said liquid foamable polymer adhesive is directed upwardly from a location which is below said roof.

11. The method as set forth in claim 5, wherein:

said fine elongated stream of said liquid plural component foamable polymer adhesive is directed upwardly from a location which is below said roof.

12. The method as set forth in claim 5, wherein:

said fine elongated stream of said liquid plural component foamable polymer adhesive initially forms a thin bead of liquid foamable polymer adhesive along said intersections defined between said upper ends of said support members and said interior surfaces of said roof panels before creaming and rising so as to form said gussets of polymer foam adhesively bonded to said upper ends of said support members and said interior surfaces of said roof panels.

13. The method of reinforcing and securing the roof of a building against forces tending to lift the roof off the building as set forth in claim 9, further comprising the step of:

directing said thin elongated stream of said plural component liquid foamable polyurethane adhesive upwardly along both sides of each one of said support members so as to form gussets of said plural component liquid foamable polyurethane adhesive upon both sides of said support members and along adjacent surface portions of said upper ends of said support members and said interior surfaces of said roof panels.

14. The method of reinforcing and securing the roof of a building as set forth in claim 9, wherein:

said thin elongated stream of said plural component liquid foamable polyurethane adhesive initially forms a thin bead of plural component liquid foamable polyurethane adhesive along said intersections defined between said upper ends of said support members and said interior surfaces of said roof panels before creaming and rising so as to form said gussets of said polyurethane foam adhesively bonded to said upper ends of said support members and said interior surfaces of said roof panels.

15. The method as set forth in claim 9, wherein:

said thin elongated stream of said plural component liquid foamable polyurethane adhesive is directed upwardly from a location which is below said roof.

* * * * *